July 31, 1945.　　　　L. C. HUFF　　　　2,380,760
CATALYTIC CONVERSION OF HYDROCARBON OIL
Filed April 27, 1944
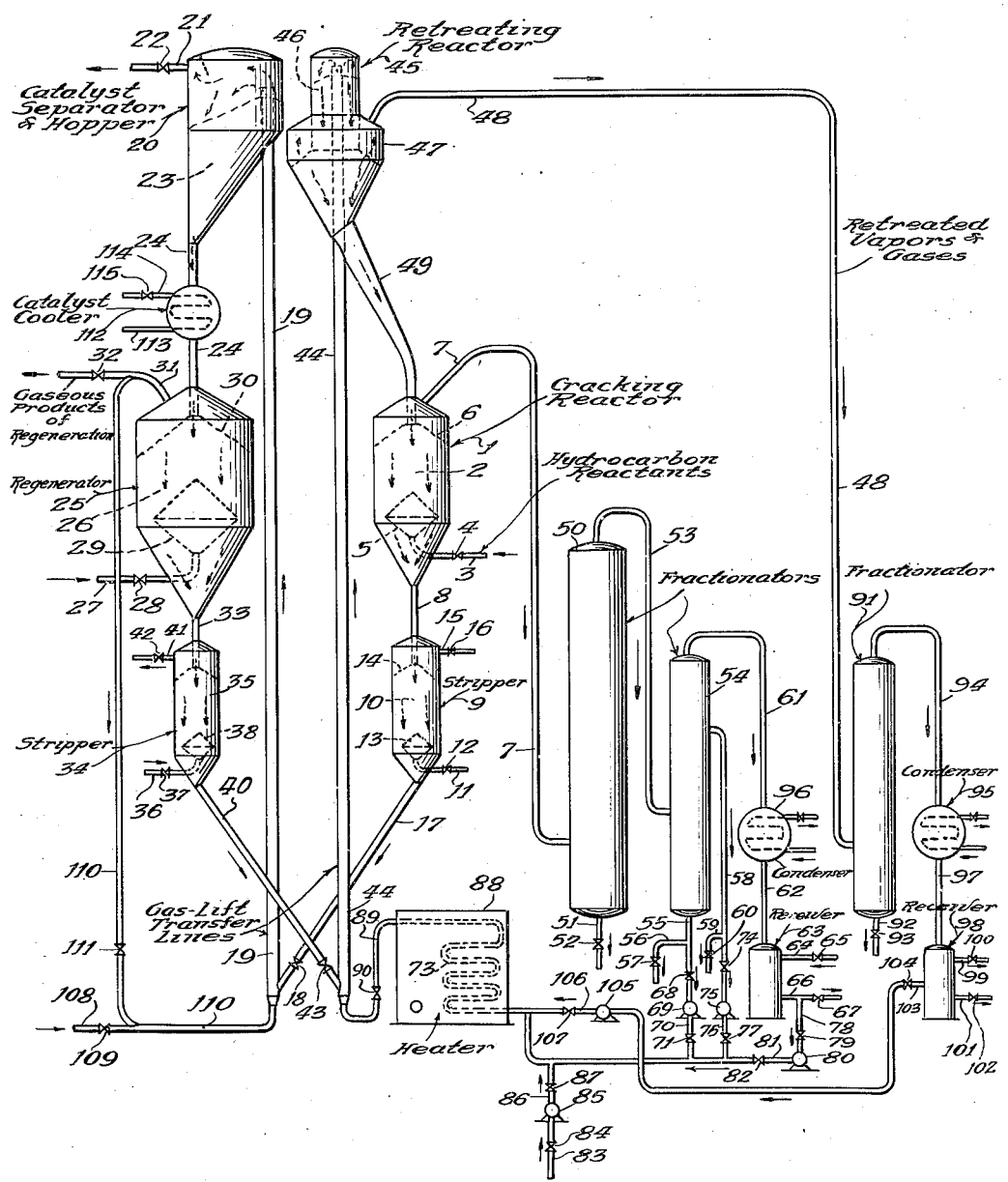
Inventor:
Lyman C. Huff
By: Lee J. Gary
Attorney Patented July 31, 1945

2,380,760

UNITED STATES PATENT OFFICE 2,380,760

CATALYTIC CONVERSION OF HYDRO-
CARBON OIL

Lyman C. Huff, Chicago, Ill., assignor to Universal
Oil Products Company, Chicago, Ill., a corporation of Delaware Application April 27, 1944, Serial No. 532,934

5 Claims. (Cl. 196—49)

The invention is directed to an improved process and apparatus for the catalytic cracking of hydrocarbon oil boiling above the range of gasoline for the production of gasoline boiling range material. The invention is further concerned with the catalytic treatment of fractions boiling within the range of gasoline to effect an improvement in their quality such as a reduction in their olefin content and an improvement in their octane rating, lead susceptibility or blending value.

The cracking catalyst employed is in the form of solid particles, preferably of substantially uniform or well graded size and preferably of substantially spherical shape, although other regular or irregular shaped granules may be employed. In composition, the catalyst may correspond to any of the several well known solid cracking catalysts which are also suitable for the reforming or so-called "retreatment" of gasoline fractions to improve their quality. Such catalysts, in general, comprise silica composited with one or more metal oxides, such as alumina, zirconia, magnesia and the like. Although the best catalysts of this type are prepared synthetically, certain natural clays and treated natural clays are suitable. The most common of these is a treated non-swelling bentonite known as "superfiltrol." When prepared synthetically the materials employed are preferably treated for the substantially complete removal of alkali metal compounds during some stage of their preparation. One suitable method of preparing synthetic catalyst of this type in substantially spherical form is disclosed in application Serial Number 516,392 of Glenn M. Webb and Reno W. Moehl, filed December 31, 1943.

One step of the process comprises the catalytic cracking of petroleum fractions such as gas oil, kerosene, kerosene distillate and the like to convert the same into substantial yields of fractions boiling within the range of gasoline.

A second step of the process comprises burning combustible contaminants accumulated by the catalyst in the cracking step therefrom to restore its catalytic activity to a relatively high value. This regeneration of the catalyst is accomplished in a confined regenerating zone separate from the reaction zone in which the cracking step is conducted.

A third step of the process comprises a reforming or retreating operation in which the freshly regenerated catalyst is employed to effect an improvement in the quality of gasoline fractions. Although gasoline, naphtha or the like from an external source may be employed as all or a portion of the stock to be converted in this third step, it is generally desirable to effect the retreatment in this step of all or selected fractions of the gasoline product formed in the cracking operation and this is specifically contemplated by the invention. The reforming or retreating step is accomplished in a confined reaction zone separate from the cracking reactor and the regenerator and catalyst is returned from this reforming or retreating step to the cracking step for further use therein in promoting the cracking reaction.

The process is of the general type in which a relatively compact bed of the solid catalyst particles is maintained in each of the reaction zones and in the regenerating zone. The catalyst particles are passed downwardly through each of these beds and are circulated serially through the cracking reactor, the regenerator and the retreating or reforming reactor in the order named. For convenience in identifying this general type of operation and distinguishing it from operations of the type in which the catalyst beds are maintained in a turbulent fluid-like condition, it may be termed a "compact, moving bed operation."

Operations of the compact moving bed type offer certain advantages over operations of the turbulent fluid bed type in that more uniform and efficient contact may be obtained between the catalyst particles and fluid reactants than that ordinarily accomplished when a turbulent fluid-like condition prevails within the bed. Further, the use of a relatively compact bed in the regenerator with countercurrent flow between the catalyst particles and the oxidizing gas employed for effecting their regeneration permits more complete regeneration than that ordinarily accomplished in a turbulent fluid-like bed.

One of the important advantages of the fluid bed type of operation which is not shared by the compact moving bed type, as the latter has been heretofore practiced, resides in the flexibility of operating conditions which it permits and the ability to transport the catalyst from the reactor to the regenerator in the incoming stream of oxidizing gas employed for its regeneration and to transport the catalyst from the regenerator into the reactor in the incoming stream of fluid reactants to be converted. As heretofore practiced, operations of the compact moving bed type have employed mechanical conveyers or elevators for effecting transfer of the catalyst from the reaction zone to the regenerating zone and vice versa. This places a low practical limit on the rate at which the catalyst may be circulated through the system and thus hampers judicious use of one of the important operating variables.

It is the purpose of the present invention to provide a three-stage process of the character above outlined employing a relatively compact bed of downwardly moving catalyst particles in each of the three named contacting vessels comprising the cracking reactor, regenerator and reforming or retreating reactor and in which transfer of the catalyst withdrawn from the regenerating step to the subsequent reforming or retreating step is effected by the gas-lift action of the relatively low boiling fractions to be retreated or reformed.

The invention also contemplates the use, when desired, of similar low boiling, normally liquid fractions for effecting transfer, by their gas-lift action, of catalyst withdrawn from the cracking reactor and supplied to the regenerator.

The features and advantages of the invention will be further explained with reference to the accompanying diagrammatic drawing which illustrates one specific form of apparatus in which the process provided may be successfully conducted.

Referring to the drawing, the cracking reactor is indicated at 1 and is supplied with a stream of relatively active catalyst particles, as will be later described. A relatively compact bed 2 of the catalyst particles is maintained within the reactor and the hydrocarbon oil to be converted is supplied through line 3 and valve 4, preferably in essentially vaporous state, to a distributing member 5 provided within the reactor. In the case illustrated, the upper portion of member 5 comprises a perforate section or grid of substantially conical form having a slope which approximately corresponds to that of the upper extremity 6 of the catalyst bed. The incoming hydrocarbon reactants are directed from member 5 upwardly into the bed and substantially uniformly over its cross-sectional area.

Suitable conditions of temperature, pressure, space velocity and catalyst-oil ratio are maintained within the reaction zone for effecting the desired cracking of the hydrocarbon oil charged thereto. The term "space velocity" as here used may be defined as weight of hydrocarbon reactants supplied to the reaction zone per hour, per unit weight of catalyst present within the bed in the reactor. The term "catalyst-oil ratio" may be defined as the weight of catalyst supplied to the reaction zone, per unit weight of hydrocarbon reactants supplied thereto in a given time.

The hydrocarbon reactants and resulting vaporous and gaseous conversion products pass upwardly through bed 2 in the cracking reactor countercurrent to the general downward flow of the catalyst particles through the bed and are supplied from the space provided within the reactor between the upper extremity of the catalyst bed and the upper end of the vessel through line 7 to suitable fractionating and recovery equipment which will be later described. The catalyst particles in passing through bed 2 accumulate deleterious combustible contaminants which must be burned therefrom to restore their catalytic activity to the desired relatively high value. The contaminated catalyst passes downwardly from bed 2 about the outer periphery of member 5 into the cone-like bottom section of the cracking reactor and is directed downwardly therefrom in the form of a relatively compact stream or column through conduit 8 into a suitable stripping vessel 9.

The column of catalyst particles passing through conduit 8 will contain some occluded and adsorbed volatile hydrocarbons in addition to the contaminants which must be burned therefrom to regenerate the catalyst. The catalyst is preferably purged of all or a substantial portion of these occluded and adsorbed volatile hydrocarbons before being supplied to the regenerating step and stripper 9 is provided for this purpose in the case illustrated. A relatively compact bed 10 of the catalyst particles is maintained in the stripping vessel and suitable stripping gas such as steam, for example, is supplied to the bed through line 11, valve 12 and the distributing member 13 which is similar in this instance to member 5 in reactor 1. The stripping gas passes upwardly through bed 10 countercurrent to the catalyst particles which pass downwardly through the bed and largely replaces the occluded and adsorbed volatile hydrocarbons. Stripping gas and resulting stripped-out volatiles are discharged from the upper extremity 14 of bed 10 into the space provided between the latter and the upper end of the stripping vessel and are thence directed through line 15 and valve 16, preferably to suitable equipment for recovering stripped-out hydrocarbons. This recovery equipment may conveniently be the same as that to which vaporous and gaseous products are supplied from the reactor through line 7.

The substantially stripped catalyst is directed downwardly in the form of a relatively compact stream or column from the lower portion of stripping vessel 9 through conduit 17 and through the adjustable orifice or flow control valve 18 disposed within this conduit adjacent its lower end into transfer line 19. Here the catalyst particles are commingled with a stream of suitable transporting fluid capable of exerting a gas-lift action on the solid particles. The commingled stream is directed upwardly through transfer line 19 into a separating vessel and hopper 20 which is operated at a lower pressure than that prevailing at the inlet end of transfer line 19. The velocity of the commingled stream supplied to vessel 20 from line 19 is reduced to such an extent that all or a major portion of the solid particles separate by gravity from the transporting fluid. The transporting fluid is discharged from the upper portion of the separating vessel through line 21 and the pressure control valve 22. The separated catalyst particles are collected in the form of a relatively compact bed indicated at 23 within the hopper-like lower portion of vessel 20 and a relatively dense stream or column of the separated catalyst is directed downwardly from bed 23 through conduit 24 into the regenerating vessel 25.

A relatively compact bed 26 of downwardly moving catalyst particles is maintained within regenerator 25. Oxidizing gas such as, for example, air or air diluted with non-combustible gas is supplied through line 27 and valve 28 to the distributing member 29 which is disposed in the lower portion of the regenerator and is similar in form and function to member 5 in the reactor. The oxidizing gas is directed upwardly from member 29 into bed 26 and burns from the latter combustible contaminants accumulated by the catalyst particles in the reaction zone. The oxidizing gas and resulting combustion gases pass upwardly through bed 26 countercurrent to the general downward flow of the catalyst particles through the bed and resulting gaseous products of combustion are discharged from the upper extremity 30 of bed 26 into the space provided between the latter and the upper end of the regenerating vessel. The gases are discharged from the regenerator through line 31 and may be directed, all or in part, through valve 32, preferably to suitable heat recovery equipment, not illustrated, such as, for example, a waste-heat boiler, steam superheater, hot gas turbine or the like. The manner in which all or a regulated portion of these gases may be employed as transporting fluid in transfer line 19 will be later described.

The catalyst regenerated as above described passes downwardly from bed 26 about the outer periphery of member 29 into the cone-like bottom section of the regenerator from which it is directed in the form of a relatively compact stream or column through conduit 33 into stripping vessel 34. Stripper 34 is provided, in the case illustrated, for the purpose of substantially purging the catalyst discharged from the regenerator of occluded and adsorbed oxidizing gas and combustion gases before it is again commingled with hydrocarbon reactants. A relatively compact bed 35 of the downwardly moving catalyst particles is maintained in stripper 34 and suitable stripping gas such as steam, for example, is supplied to the lower portion of the bed through line 36, valve 37, and distributing member 38. This member is also similar in form and function to member 5 in the reactor. Stripper 34 operates in the same general manner as stripper 9 and stripping gas, together with stripped-out gases, is discharged from the upper extremity of bed 35 into the space provided between the latter and the upper end of the stripping vessel. It is thence discharged through line 41 and valve 42.

Regenerated and substantially stripped catalyst particles are directed downwardly in the form of a relatively compact stream or column from the lower portion of stripper 34 through conduit 40 and the adjustable orifice or flow control valve 43, provided in this conduit adjacent its lower end, into another transfer line 44. In line 44 the freshly regenerated and stripped catalyst particles are commingled with vaporous hydrocarbons of a relatively low boiling nature such as gasoline or naphtha fractions to be reformed. The hydrocarbon vapors exert a gas-lift action on the solid particles in transfer line 44 and the commingled stream is directed upwardly therethrough into the retreating reactor 45 where the pressure maintained is less than that prevailing at the inlet end of transfer line 44.

In the particular case illustrated, general concurrent flow between the hydrocarbon reactants and the catalyst particles is employed in the retreating reactor 45. The catalyst particles discharged into this reactor from line 44 are collected therein in the form of a relatively compact bed 46 and pass downwardly through the bed into the enlarged hopper-like lower section of the reactor. The hydrocarbon vapors discharged from line 44 also pass downwardly through bed 46 concurrent and in contact with the catalyst particles of the bed. Suitable conditions of temperature, pressure, space velocity and catalyst-oil ratio are maintained within reactor 45 to effect the desired retreatment or reforming of the relatively low boiling hydrocarbons in this zone. Resulting vaporous and gaseous conversion products are disengaged from the catalyst particles in the lower enlarged section 47 of reactor 45 where the vapors and gases reverse their direction of flow and where their velocity is sufficiently low that the catalyst particles will separate therefrom by gravity. These vapors and gases are thence directed through line 48 to suitable fractionating and recovery equipment which will be later described.

In passing through bed 46 in reactor 45, the catalyst particles will accumulate some deleterious contaminants similar to those accumulated in the cracking reactor 1. However, the space velocity employed in reactor 45 is sufficiently low that the contaminants accumulated by the catalyst in this zone reduce its activity to only a minor degree and leave it sufficiently active for promoting the cracking reaction. This is due in part to the relatively high catalyst activity which results from the substantially complete removal of combustible contaminants from the catalyst in the regenerating step where countercurrent flow is employed between the catalyst particles and the oxidizing gas. More complete regeneration may be accomplished in this manner as compared with that accomplished by concurrent flow or with a turbulent fluid-like catalyst bed in the regenerator.

A relatively compact stream or column of catalyst particles is directed downwardly from the hopper-like lower section of reactor 45 through conduit 49 into bed 2 in the cracking reactor to complete the catalyst circuit through the system. When desired, a suitable stripping zone may be interposed in conduit 49. However, this is not considered necessary since the passage of occluded and adsorbed hydrocarbons from the retreating step into the cracking step with the catalyst transferred therebetween is not particularly objectionable.

The catalyst-oil ratio in reactor 45 may be and is ordinarily higher than that which would be employed in a conventional retreating or reforming operation not associated with the cracking operation in the same manner as herein provided. This is due to the fact that in the present process the rate of catalyst circulation through the system is preferably controlled to give the desired catalyst-oil ratio in the cracking reactor 1 even though this may result in a higher catalyst-oil ratio than required in reactor 45. This will not be detrimental to the retreating or reforming operation. Although a certain minimum catalyst-oil ratio is required, a higher value for this factor will simply give a closer approach between the temperature to which the reactants are heated and the temperature of the catalyst bed in the reactor. This is advantageous in the present instance in that the catalyst may be employed as herein provided in the retreating or reforming step without cooling it to below the temperature desired in the subsequent cracking step to which it is supplied.

Vaporous and gaseous products of the cracking reaction discharged from reactor 1 through line 7, as previously described, are supplied, in the case illustrated, to fractionator 50. When desired, stripping gas and stripped-out volatile hydrocarbons may also be supplied from stripper 9 to fractionator 50 by connecting lines 15 and 7. The relatively high boiling fractions of the cracked vapors supplied to fractionator 50 are condensed within this zone as reflux condensate and collected in the lower portion of the fractionator from which they may be directed through line 51 and valve 52 to storage or elsewhere, as desired. The resulting fractionated vapors and gases, which preferably comprise substantially all of the gasoline boiling range material produced in the cracking operation and which may also include some higher boiling fractions, are directed from the upper portion of fractionator 50 through line 53 to a secondary fractionator 54.

Reflux condensate formed in fractionator 54 is separated, in the particular case illustrated, into selected relatively low boiling and high boiling fractions. The latter are withdrawn from the lower portion of the fractionator through line 55 and may be directed, all or in part, through line 56 and valve 57 to storage or elsewhere, as desired. The lighter reflux condensate is withdrawn from a suitable higher point in the fractionator through line 58 and may be directed, all or in part, to storage or elsewhere, as desired, through line 59 and valve 60. The heavier reflux condensate formed in fractionator 54 may comprise, for example, such material as heavy naphtha, kerosene, kerosene distillate or the like. The lighter condensate separately withdrawn from fractionator 54 may comprise selected relatively high boiling gasoline fractions either alone or together with somewhat higher boiling material.

Fractionated vapors and gases of the desired end-boiling point, which comprise either the total gasoline fractions produced in the cracking operation or selected low boiling components thereof, are directed from the upper portion of the fractionator through line 61 to condenser 96 wherein substantially all of their normally liquid components are condensed and from which resulting condensate and uncondensed gases are directed through line 62 to collection and separation in receiver 63. The uncondensed gases are discharged from the receiver through line 64 and valve 65, preferably to suitable further separating and gas concentrating equipment, not illustrated. Distillate collected in receiver 63 is withdrawn therefrom through line 66 and may be directed, all or in part, through valve 67 to storage or to any desired further treatment.

In the case illustrated, provision is made for retreating any one or any desired mixture of the distillate and light condensate fractions recovered in the fractionating and separating equipment by contacting the same under suitable conditions with the regenerated catalyst before the latter is returned to the cracking reactor, this being accomplished in reactor 45. For example, condensate withdrawn from the lower portion of fractionator 54 may be directed, all or in part, through valve 68 in line 55 to pump 69 and thence through line 70, valve 71 and line 81 to heating coil 73, the function of which will be later explained. Alternatively, or in addition, relatively light condensate withdrawn from fractionator 54 through line 58 may be directed through valve 74 in this line to pump 75 and thence through line 76, valve 77 and line 81 to a heating coil 73. As another alternative, or in addition, all or any desired portion of the distillate collected in receiver 63 may be directed from line 66 through line 78 and valve 79 to pump 80 and thence through line 81 and valve 82 to heating coil 73.

It is also within the scope of the invention to employ light condensate or distillate from an external source as stock for reforming or retreatment in reactor 45. Such stock from an external source preferably consists of or comprises fractions boiling within the range of gasoline and may be subjected to treatment in reactor 45 either alone or together with selected fractions of the light condensate or distillate formed within the system, as previously mentioned. Retreating or reforming stock from an external source may be supplied through line 83 and valve 84 to pump 85 and thence through line 86, valve 87 and line 81 to heating coil 73.

Heating coil 73 is disposed, in the case illustrated, in a suitable furnace structure 88 and the relatively light condensate and/or distillate is substantially completely vaporized in passing through the coil and preferably is also further heated in this zone to a temperature closely approaching the operating temperature desired in the retreating or reforming step. The heated vapors are directed from coil 73 through line 89 and valve 90 into transfer line 44 at the lower end of the latter. They serve, by their gas-lift action, to transport the catalyst particles supplied to this line, as previously described, upwardly through line 44 into reactor 45 where retreating or reforming of these light fractions is effected in the manner previously described.

Vaporous and gaseous products of the retreating or reforming operation discharged from reactor 45 through line 48 are supplied, in the case illustrated, to fractionator 91 wherein their components which boil above the range of the desired retreated or reformed gasoline are condensed as reflux condensate. The reflux condensate is discharged from the lower portion of fractionator 91 through line 92 and valve 93 to storage or elsewhere, as desired, and it is within the scope of the invention to supply all or a portion of this material by well known means, not illustrated, to reactor 1 as a part of the hydrocarbon oil cracking stock to be converted therein.

Fractionated vapors and gases of the desired end-boiling point are directed from the upper portion of fractionator 91 through line 94 to condenser 95 wherein substantially all of their normally liquid fractions are condensed. The resulting distillate and uncondensed gases are directed through line 97 to collection and separation in receiver 98. Gases are discharged from the receiver through line 99 and valve 100, preferably to suitable further separating and gas concentrating equipment, not illustrated. All or a portion of the distillate collected in receiver 98 is directed therefrom through line 101 and valve 102 to storage or to any desired further treatment.

It is also within the scope of the invention to return regulated quantities of the distillate collected in receiver 98 to further treatment in reactor 45. This may be accomplished by directing it from the receiver through line 103 and valve 104 to pump 105 wherefrom it is supplied through line 106 and valve 107 to heating coil 73 and thence in heated revaporized state through line 89, valve 90 and transfer line 44 to reactor 45.

It is entirely within the scope of the invention to employ readily vaporizable light hydrocarbons such as light condensate or distillate produced within the system or from an external source as transporting fluid in transfer line 19. In such instances line 21 from vessel 20 is preferably connected by well known means, not illustrated, with fractionator 50 or with fractionator 54 so as to establish a cycle of the transporting fluid within the system. The light hydrocarbons when thus utilized as transporting fluid in line 19 may be vaporized in heating coil 73 or in any other suitable heating equipment, not illustrated, and may be supplied to line 19 via line 108, valve 109 and line 110.

Any other suitable transporting fluid may be employed in line 19, when desired, and the invention specifically contemplates the use of gaseous products of regeneration from regenerator 25 for this purpose. Provision is made in the case illustrated for directing all or a regulated portion of the gases discharged from the regenerator through line 31, line 110 and valve 111 into the lower end of transfer line 19 to serve as transporting gas for the catalyst particles supplied thereto, as previously described, from the reactor. When gaseous products of regeneration are thus used as transporting fluid in line 19, they are preferably directed from vessel 20 through line 21 and valve 22 to suitable heat recovery equipment such as previously mentioned.

It is not essential to the process of the invention that the catalsyt discharged from the reactor be transported toward the regenerator by the gas-lift action of a transporting fluid. For example, it is within the scope of the invention to mount the reaction vessel and the succeeding stripping vessel above the regenerator so that catalyst particles will flow by gravity from the retreating reactor downwardly through the cracking reactor, the succeeding stripper, the regenerator and the stripper succeeding the regenerator into a gas-lift transfer line corresponding to line 44 wherein they are transported by the vaporized distillate or condensate to be retreated or reformed back into the retreating reactor. However, this arrangement will necessitate a relatively high and expensive supporting structure for the various contacting vessels and I prefer to employ an arrangement such as that illustrated to reduce the required height of the structure.

With most charging oils it is characteristic of catalytic cracking operations for the production of commercially satisfactory yields of aviation base gasoline or motor gasoline of good antiknock value that the quantity of combustible contaminants accumulated by the catalyst is in excess of that required for a thermal balance between the reaction and regenerating step. In other words, when the relatively large amount of combustibles is burned from the catalyst in the regenerating step, the heat stored in the catalyst particles will be more than that required for conducting the cracking reaction. On the other hand, the quantity of combustible contaminants accumulated by the catalyst particles in a retreating or reforming operation of the type contemplated by the invention is relatively low in comparison with that resulting from most catalytic cracking operations and may in many instances be less than that required for thermal balance between the retreating or reforming step and the regenerating step.

By combining the reforming or retreating operation with the cracking operation in a unitary system such as provided by the invention, a closer approach to overall thermal balance is obtained between the regenerating step and the two hydrocarbon conversion steps. Thus, substantially all of the endothermic heat of reaction may be supplied to the cracking zone in the catalyst and the necessity for abstracting large quantities of excess heat from the circulating catalyst stream is avoided.

Depending upon the particular stock to be treated and the operating conditions employed, the retreating or reforming operation may be mildly endothermic or mildly exothermic or neutral. In case it is endothermic, there will ordinarily be a sufficient quantity of heat in the catalyst discharged from the regenerator to supply most, if not all, of the required heat of reaction in the retreating or reforming step, as well as in the cracking step. When this is not the case, the small amount of additional heat required may be supplied in the preheating and vaporizing step through which the retreating or reforming stock is passed prior to its introduction into the gas-lift transfer line.

When heat in excess of that required for conducting the cracking and the reforming or retreating operations would otherwise be developed in the regenerator and stored in the catalyst discharged from this zone, I contemplate abstracting an amount of heat equivalent to this excess from the catalyst at a convenient point in the catalyst circuit. This is accomplished in the case illustrated by providing a catalyst cooler 112 in conduit 24 leading from vessel 20 to the regenerator. A suitable cooling fluid such as steam, water, oil, molten salt or the like is supplied to cooler 112 through line 113, passed through the cooler in indirect contact and heat transfer relation with the catalyst particles passing therethrough and is discharged from the cooler at increased temperature through line 114 in an amount controlled by valve 115. Alternatively, suitable means, not illustrated, may be provided for cooling the catalyst accumulated in bed 23 within vessel 20 or a suitable cooler may be provided in transfer line 19 or in conduits 8 or 17.

With a catalyst cooler provided in any of the locations above mentioned, an amount of heat equivalent to the excess developed within the regenerator and stored in the catalyst passing therethrough will be abstracted from the catalyst before it enters the regenerator. With this mode of operation the rate at which catalyst is circulated through the system is controlled, by the adjustment of valves 18 and 43, so that the temperature of the catalyst leaving the regenerator is not greatly in excess of the average temperature desired in the retreating or reforming step. This same consideration determines the catalyst circulation rate when the system is substantially balanced thermally and no catalyst cooler is required.

An alternative mode of operation contemplated by the invention involves providing a suitable catalyst cooler in conduit 33 or conduit 40 or in transfer line 44 to reduce the temperature of the catalyst discharged from the regenerator to the desired degree before it is supplied to the reaction zones. A cooler in any of these last named locations may be employed either alone or in conjunction with the use of a catalyst cooler in any of the previously mentioned locations and with this type of operation the regenerator may be operated at a higher average temperature than in the previously described mode of operation.

It is also within the scope of the invention to circulate cooling fluid through the regenerating vessel in indirect contact and heat transfer relation with the catalyst passing through bed 26 so as to abstract therefrom any excess heat developed in the regenerating step which would otherwise be stored in the regenerated catalyst. However, this complicates the design and construction of the regenerating vessel and I prefer, when cooling of the catalyst is required, to use one or more external coolers or heat exchangers.

It is also possible within the scope of the invention to reduce the amount of heat stored in the regenerated catalyst by passing a larger quantity of regenerating gas through bed 26 in the regenerator. This will result in the removal of more heat from the regenerator in the outgoing gas stream and less in the outgoing catalyst stream. However, the cost of compressing the regenerating gas for delivery to the regenerator is an important item of expense in operating the system and I prefer to minimize the amount of gas which must be employed for this purpose by using undiluted air as the oxidizing gas stream.

The selection of suitable operating conditions for use in the various steps of the process is within the skill of those familiar with the art. Their choice will depend upon the particular relatively light and relatively heavy oils to be converted, specific catalyst to be employed and the desired yield and quality of the final gasoline product. In general, when employing a siliceous cracking catalyst such as above mentioned, the average temperature employed in the cracking reactor may range from 800 to 1025° F., or thereabouts. With a compact catalyst bed in the cracking reactor and with all or a substantial portion of the endothermic heat of reaction supplied to the hydrocarbon reactants by the catalyst, there will be some decrease in the temperature of the catalyst as it passes through the bed. This temperature gradient should not be more than about 100° F. for best results and is preferably less, for example, of the order of 50° F. It will vary in indirect relation to the catalyst-oil ratio. The latter, of course, depends upon the rate of catalyst circulation through the system and the rate at which hydrocarbon reactants are supplied to the cracking reactor. I preferably keep the catalyst circulation rate and the catalyst-oil ratio in the cracking reactor at a sufficiently high value that at least a major portion of the endothermic heat of cracking may be supplied by the catalyst in this zone without an excessive temperature gradient across the bed.

The catalyst-oil ratio in the cracking reactor will vary in direct relation to the average cracking temperature employed and in inverse relation to the temperature of the catalyst leaving the regenerator. It may range, for example, from 1 to as much as 20 or more and will ordinarily be of a relatively high order, say from 6 to 12, or thereabouts. The space velocity employed in the cracking reactor may range from 1 to 12 or more, depending upon the stock undergoing treatment and the quality of gasoline product desired. It will ordinarily be lower when the process is operated for the production of aviation base gasoline than when it is operated for the production of motor gasoline.

The pressure employed in the cracking reactor may range from substantially atmospheric to 100 pounds gauge or more. Relatively low pressure is generally preferred and, in most instances, the vapor outlet pressure from the reactor is not much greater than that required to overcome pressure drop and resistance to flow through the fractionating and recovery equipment. A minimum of 6 to 8 pounds gauge is usually required.

The catalyst circulation rate through the retreating or reforming reactor will be the same as that through the cracking reactor in the embodiment of the process illustrated and above described. The rate at which distillate to be retreated is supplied to this reactor will ordinarily be considerably lower than the rate at which hydrocarbon reactants are supplied to the cracking reactor. Thus, the catalyst-oil ratio in the retreating or reforming step will usually be materially greater than that employed in the cracking step. This is desirable to minimize any decrease in the temperature of the catalyst as it passes through the retreating or reforming step. The latter is preferably operated at substantially the same or slightly higher temperature than that employed in the cracking reactor, although it may be somewhat less in case the retreating operation is mildly exothermic. The space velocity preferred in the retreating or reforming step is less than that employed in the cracking step and may range, for example, from 0.5 to 5, or thereabouts. The pressure employed at the vapor outlet of the retreating reactor is preferably about the same or somewhat less than that employed at the vapor outlet of the cracking reactor.

The maximum temperature to which the catalyst is heated in the regenerating step should not exceed about 1200 to 1300° F. with a siliceous cracking catalyst of the nature above mentioned in order to avoid damage or permanent impairment to its activity. Preferably, it is of a lower order than that mentioned and for best results in the particular embodiment of the invention illustrated and above described, the temperature of the catalyst leaving the regenerator should be relatively close, say within 50 to 75° F. of the average temperature desired in the retreating or reforming step. The operating pressure employed at the gas outlet from the regenerator will usually be about the same as that employed at the vapor outlet from the cracking reactor.

I claim:

1. The hydrocarbon oil conversion process which comprises maintaining a bed of solid cracking catalyst particles in a confined reaction zone, therein contacting the same with hydrocarbons heavier than gasoline and effecting cracking of the hydrocarbons to produce a substantial yield of gasoline, separately removing resulting contaminated catalyst and resulting vaporous and gaseous conversion products from the reaction zone, fractionating the vapors to separate the same into selected liquid fractions including said gasoline, supplying the contaminated catalyst to a separate confined regenerating zone, therein maintaining another bed of catalyst particles, contacting oxidizing gas with the last named bed to burn combustible contaminants therefrom and regenerate the catalyst, separately removing resulting regenerated catalyst and gaseous products of regeneration from the regenerating zone, revaporizing at least a portion of the condensed gasoline fractions recovered as aforesaid from the vaporous conversion products, commingling the revaporized material with regenerated catalyst particles removed as aforesaid from the regenerating zone and effecting transportation of the catalyst particles by the lifting action of the vapors with which they are commingled to an elevation above said reaction zone, effecting retreating of said revaporized fractions to improve their quality by contact between the latter and the regenerated catalyst with which they are commingled, separating resulting retreated vapors from the catalyst particles which they have transported and contacted, recovering resulting retreated gasoline fractions, and directing a stream of the thus separated catalyst particles downwardly into said bed in the reaction zone for further use therein in promoting the cracking reaction.

2. The process of claim 1 wherein said condensed and revaporized hydrocarbons employed as said transporting fluid consist essentially of selected fractions of the total gasoline boiling range product of said cracking operation.

3. The process of claim 1 wherein said condensed and revaporized hydrocarbons employed as the transporting fluid include components of the cracked products boiling above the range of gasoline.

4. The process of claim 1 wherein said condensed and revaporized hydrocarbons employed as the transporting fluid include gasoline fractions from an external source.

5. The hydrocarbon oil conversion process which comprises circulating solid particles of cracking catalyst serially through a confined reaction zone and a separate confined regenerating zone, maintaining a bed of the catalyst particles in each of said zones, cracking hydrocarbon oil heavier than gasoline by contacting the same with the catalyst bed in the reaction zone under cracking conditions, burning combustible contaminants from the catalyst in the regenerating zone by contacting oxidizing gas with the catalyst bed therein under combustion conditions, separately removing resulting gaseous products of regeneration and highly active regenerated catalyst from the regenerating zone, vaporizing a relatively low boiling oil comprising gasoline fractions and commingling the vapors with regenerated catalyst particles so removed from the regenerating zone, transporting the latter by the gas-lift action of the vapors with which they are commingled upwardly to an elevation above said reaction zone and effecting a material improvement in the quality of said gasoline fractions by their contact with the highly active regenerated catalyst, separating resulting transported and partially contaminated catalyst particles from the thus treated vapors and directing the separated catalyst particles downwardly from said zone of separation into said bed in the reaction zone while they are still in sufficiently active state to promote said cracking reaction.

LYMAN C. HUFF.